United States Patent
Sugiyama

(10) Patent No.: US 6,554,343 B2
(45) Date of Patent: Apr. 29, 2003

(54) SAFETY SEAT FOR A BABY

(76) Inventor: Iwao Sugiyama, 392-2, Sangamyo, Yaizu-shi Shizuoka-ken (JP)

( * ) Notice: Subject to any disclaimer, the term of this patent is extended or adjusted under 35 U.S.C. 154(b) by 34 days.

(21) Appl. No.: 09/726,882

(22) Filed: Nov. 30, 2000

(65) Prior Publication Data

US 2002/0027369 A1 Mar. 7, 2002

Related U.S. Application Data

(63) Continuation-in-part of application No. 09/316,160, filed on May 21, 1999, now abandoned.

(51) Int. Cl.[7] .............................. A47D 7/04; B60N 2/26
(52) U.S. Cl. ............................................. 296/68.1; 5/94
(58) Field of Search .............................. 296/24.1, 35.4, 296/68.1, 65.02, 97.21; 5/118, 94; 280/31, 47.12, 47.38, 47.41; 297/258.1, 219.12, 250.1, 230

(56) References Cited

U.S. PATENT DOCUMENTS

| | | | | |
|---|---|---|---|---|
| 155,488 A | * | 9/1874 | Blackman ................ | 280/47.38 |
| 1,596,689 A | * | 8/1926 | Silver ..................... | 5/94 |
| 1,698,601 A | * | 1/1929 | Merrill .................... | 5/104 |
| 1,762,680 A | * | 6/1930 | Debelack .................. | 280/31 |
| 1,885,493 A | * | 11/1932 | Tyler ...................... | 5/94 |
| D193,051 S | * | 6/1962 | Jacobs ..................... | 5/655 |
| 3,159,850 A | * | 12/1964 | Aldrich et al. ........... | 5/94 |
| 3,203,011 A | * | 8/1965 | Faludi ..................... | 5/94 |
| 3,454,968 A | * | 7/1969 | Beckman .................. | 5/118 |
| 3,735,430 A | * | 5/1973 | Platz ....................... | 5/118 |
| 5,310,245 A | * | 5/1994 | Lyszczasz ................. | 297/219.12 |
| 5,826,287 A | * | 10/1998 | Tandrup .................... | 297/219.12 |
| 5,829,829 A | * | 11/1998 | Celestina-Krevh ......... | 297/219.12 |
| 5,916,089 A | * | 6/1999 | Ive ......................... | 297/219.12 |
| 6,205,600 B1 | * | 3/2001 | Sedlack ................... | 297/250.1 |

FOREIGN PATENT DOCUMENTS

| | | | | |
|---|---|---|---|---|
| DE | 2610234 A1 | * | 9/1976 | |
| GB | 1296880 | * | 11/1972 | ............... 5/118 |

* cited by examiner

Primary Examiner—D. Glenn Dayoan
Assistant Examiner—Jason Morrow
(74) Attorney, Agent, or Firm—Harrison & Egbert

(57) ABSTRACT

A safety seat for a baby including a baby container, a mounting rod and a baby restraint pad. The baby container is made of a shell and a wire frame. The shell is an elastic material, which is either net-like or opaque. The wire frame is covered by the elastic material and forms the shell into a three-dimensional curved triangular shape with an interior volume for holding a baby. The shape has a rectangular base, parabolic sides and curved end pieces. The mounting rod connects to the baby container along a top edge of the triangular shape so as to form a single axis of rotation for swinging the container. The mounting rod also attaches to a support frame of a motor vehicle, stroller or rocker. The baby restraint pad has a rectangular base corresponding to the base of the baby container so that the pad can be placed in an interior volume of the baby container. The baby restraint pad also has stabilizer blocks longitudinally spaced on the top surface of the pad so as to securely hold a baby when swinging.

1 Claim, 7 Drawing Sheets

SAFETY SEAT FOR A BABY

CROSS-REFERENCE TO RELATED APPLICATIONS

The present application is a continuation-in-part of U.S. application Ser. No. 09/316,160, filed on May 21, 1999, and entitled "BABY CONTAINER FOR AN AUTOMOBILE", now abandoned.

BACKGROUND OF THE INVENTION

1. Field of the Invention

The present invention relates to a safety seat for a baby. More specifically, the safety seat is for use in motor vehicle so as to protect a baby contained therein from abrupt jolts during a collision, a starting or a stopping of the vehicle.

2. Description of Related Art

Japanese Utility Model Laid-Open Publication No. Hei 5-74976 discloses a child seat in an automobile. As shown in FIGS. 11 and 12, this child seat is attached to the roof of the automobile by means of three straps 2a, 2b and 2c and is provided with a seat belt 3. As shown in FIG. 13, this child seat is fastened to the seats of the automobile by means of fastening belts 7 in order that the child seat is restrained from swinging. A child is put on the child seat and fastened by means of the seat belt 3.

The above-mentioned child seat has advantages. For example, since the child seat is attached to the roof of the automobile, the driver of the automobile can see the child on the child seat by means of a rearview mirror in the automobile.

However, the above-mentioned child seat also has disadvantages. For instance, the child is seated on the child seat and fastened thereto by means of the seat belt 3. The child seat is restrained from swinging. Therefore, during a collision of the automobile, the child is squeezed by the narrow seat belt. This risk of squeezing is very dangerous. Also, the child seat is not usable by a baby who is too young and too small to be properly seated using the seat belt 3.

It is therefore an object of the invention to provide a safety seat for a baby, which obviates all the disadvantages of the prior art.

It is another object of the invention to provide a safety seat for a baby, which is suitable for a baby who is too young or too small to be properly seated on a child seat of the prior art.

It is a further object of the invention to provide a safety seat for a baby, which protects a baby contained therein from abrupt jolts during a collision, a starting or a stopping of the automobile.

These and other objects have been attained by a safety seat disposed at a high position within an automobile so that the safety seat can be seen by the driver of the automobile by means of a rearview mirror, wherein both the front side and the rear side of the safety seat are made of an opaque material through which the driver can see.

BRIEF SUMMARY OF THE INVENTION

The present invention is a safety seat for a baby comprising a baby container, a mounting rod and a baby restraint pad. The baby container is made of a shell and a wire frame. The shell is an elastic material, which is either net-like or opaque. The wire frame is covered by the elastic material and forms the shell into a three-dimensional curved triangular shape with an interior volume for holding a baby. The shape has a rectangular base, parabolic sides and curved end pieces. The mounting rod connects to the baby container along a top edge of the triangular shape so as to form a single axis of rotation for swinging the container. The mounting rod also has a means for attaching to a support frame. The baby restraint pad has a rectangular base corresponding to the base of the baby container so that the pad can be placed in an interior volume of the baby container. The baby restraint pad further comprises a plurality of stabilizer blocks longitudinally spaced on the top surface of the pad so as to securely hold a baby.

The means for attaching the mounting rod to the support frame may contain spring hinges formed of coiled springs. The coiled springs reduce the amount of swing of the baby container by exerting a force against a swinging force imparted by a collision, a starting or a stopping of the motor vehicle carrying the baby container.

Alternatively, the shell of the baby container has a bottom fastening means positioned on the bottom of the shell. The fastening means attaches to an elastic band connected to an anchor below the container. The anchor may be a seat belt in an automobile so as to reduce the amount of swing of the baby container. The elastic band reduces the amount of swing of the baby container by exerting a force against a swinging force imparted by a collision, a starting or a stopping of the motor vehicle carrying the baby container.

Furthermore, the support frame for the mounting rod may be securely positioned in a motor vehicle, a stroller or a rocker.

DETAILED DESCRIPTION OF THE INVENTION

Figure 1:
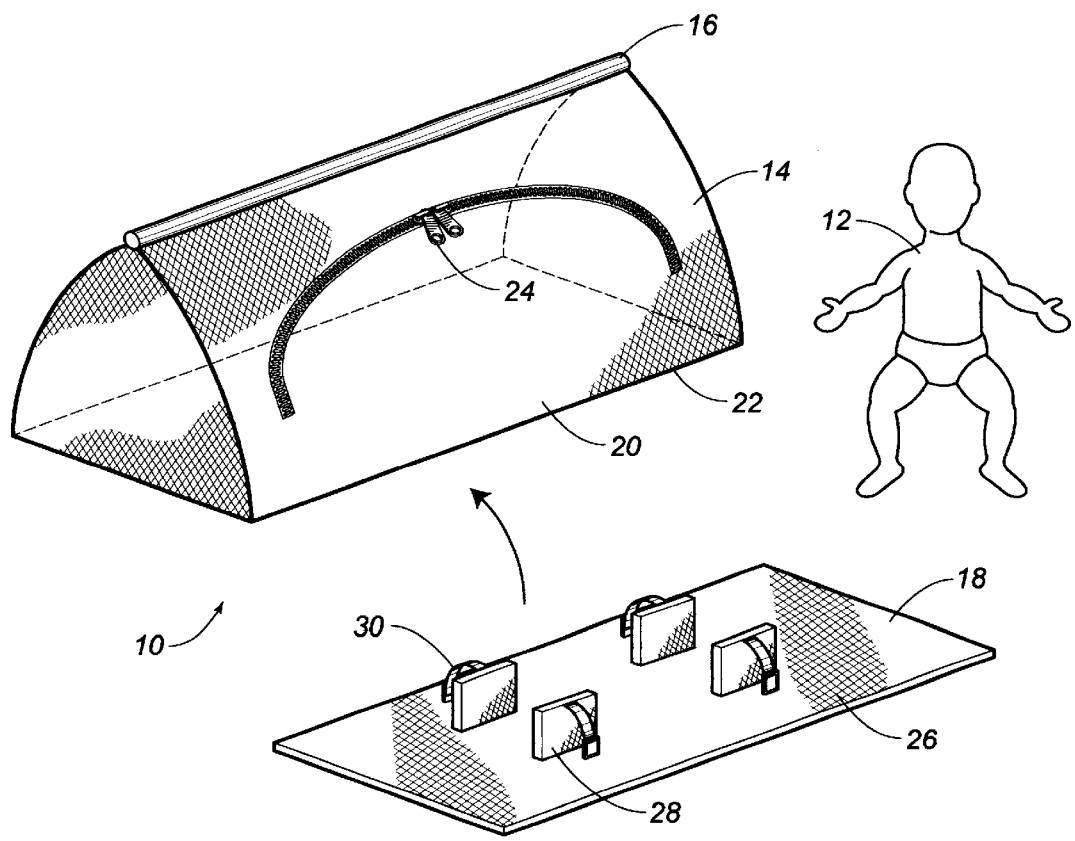
FIG. 1 is an exploded perspective view of the present invention showing the baby restraint pad removed from the interior of the baby container.

Referring to FIG. 1, there is shown an exploded perspective view of the safety seat 10 of the present invention. The safety seat 10 serves to protect a baby 12 while traveling in a motor vehicle, a stroller or a rocker because the safety seat 10 keeps the baby 12 is a stable position while moving. The safety seat 10 holds the baby 12 in a secure position when the safety seat swings as a result of a collision or a sudden stopping or starting of the vehicle. The safety seat 10 further reduces the amount of swing by exerting a force against the swinging force.

The safety seat 10 comprises a baby container 14, a mounting rod 16 and a baby restraint pad 18. The baby container 14 is made of a shell 20 and a wire frame 22. The shell 20 is made of an elastic material, which is preferably net-like or opaque. The shell also has a plurality of zippers 24 so as to allow entry into the interior volume of the shell 20. The wire frame 22 creates the shape of the baby container 14. Each of the wires in the wire frame are covered in elastic material. The mounting rod 16 is positioned along the top edge of the baby container 14 and further provides a means of attaching (not shown) the safety seat 10 to a support frame (not shown).

The baby restraint pad 18 comprises a soft flexible rectangular base 26 with stabilizer blocks 28. The baby 12 is positioned between the stabilizer blocks 28 so that the baby 12 does not roll freely in the safety seat 10. The stabilizer blocks 28 further comprise straps 30 for securing the baby between the blocks 28. One set of blocks 28 stabilizes the head of the baby 12, and the other set stabilizes the body of the baby 12. The arms of the baby 12 are allow to extend from between the sets of blocks 28.

Figure 2:
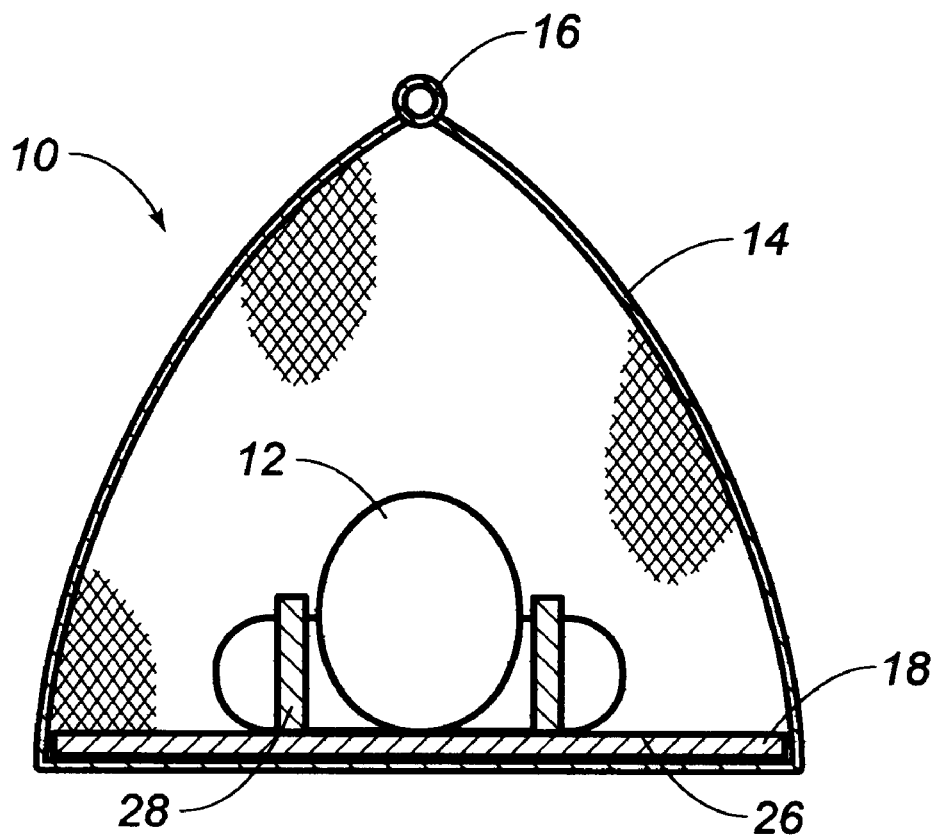
FIG. 2 is a cross-sectional view of the present invention with the restraint pad positioned in the interior of the baby container.

FIG. 2 shows a cross-sectional view of the present invention. The baby 12 is secured to the baby restraint pad 18 between the stabilizer blocks 28. The baby 12 and restraint pad 18 are positioned in the interior volume of the baby container 14. The mounting rod 16 is used to connect the safety seat 10 to a support frame (not shown).

Figure 3:
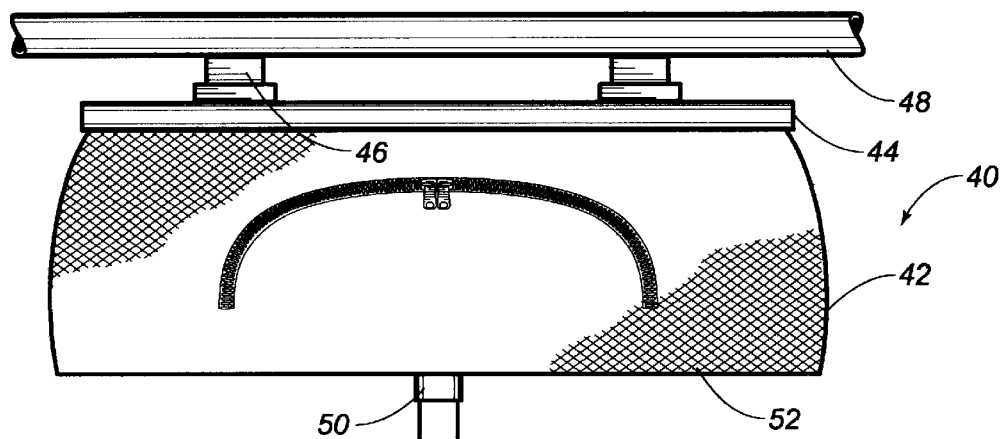
FIG. 3 is a plan view of the present invention with a bottom fastening means on the shell of the baby container.

FIG. 3 is a plan view of another embodiment of the present invention. The safety seat 40 comprises a baby container 42, a baby restraint pad (not shown) and a mounting rod 44. The mounting rod 44 has means for attaching 46 connected to a support frame 48 such that the safety seat is suspended in the air and rotatable along a single axis along the mounting rod 44. The baby container 42 further comprises a bottom fastening means 50 which is connected to the shell 52. The bottom fastening means 50 is connected to an elastic band 54. The elastic band 54 is attached to an anchor 56 positioned below the safety seat 40. The elastic band 54 exerts a force against any swinging force of the safety seat 40 so as to reduce the amount of swinging.

Figure 4:
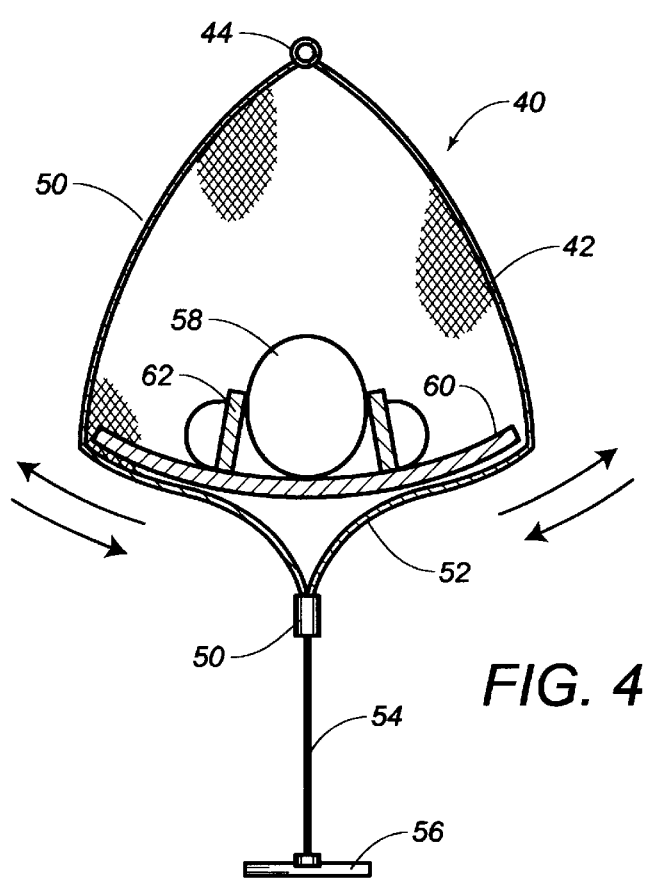
FIG. 4 is a cross-sectional view of the present invention as shown in FIG. 3.

FIG. 4 shows how the elastic band 54 stretches and contracts to exert a force against swinging. As the safety seat 40 swings and rotates about the mounting rod 16 axis, the elastic band 54 stretches and contracts to return the safety seat 40 to the original stable position. The anchor 56 may be a seat belt of a motor vehicle or other securely fastened device. As shown in FIG. 4, the bottom fastening means 50 causes the shell 52 of the baby container 42 to stretch because the shell 52 is attached to an elastic band 54. In the prior art, this distortion of the shell 52 would cause the baby 58 to rest on a distorted surface. However, in the present invention, the baby restraint pad 60 provides the baby 58 with a more stable back support so as to avoid discomfort associated with the distorted shell 52. The removable restraint pad 60 remains flexible and still functions to secure the baby 58 in place with stabilizer blocks 62.

Figure 5:
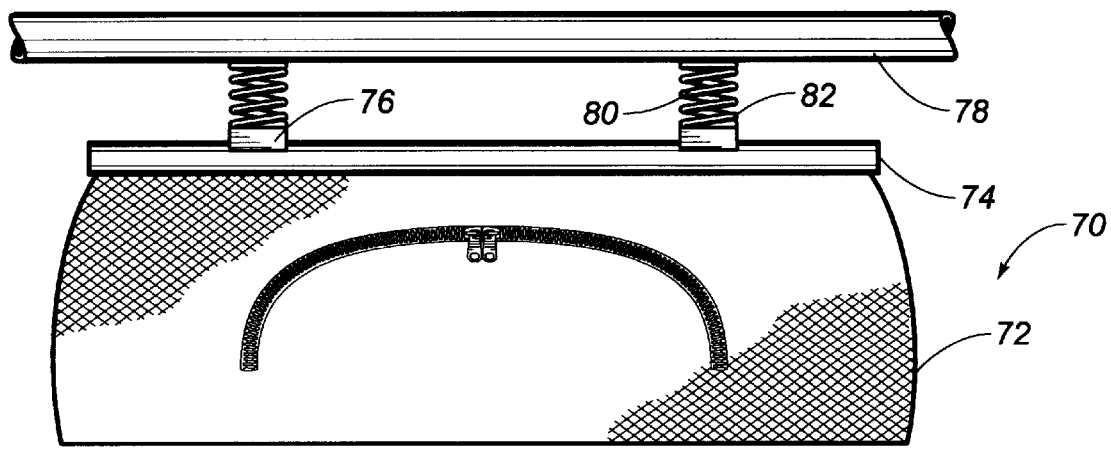
FIG. 5 is a plan view of the present invention with a spring hinge as the means for attaching the mounting rod to the support frame.

FIG. 5 is a plan view of still another embodiment of the present invention. The safety seat 70 comprises a baby container 72, a baby restraint pad (not shown) and a mounting rod 74. The mounting rod 74 has means for attaching 76 connected to a support frame 78 such that the safety seat 70 is suspended in the air and rotatable along a single axis along the mounting rod 74. The means for attaching 76 is comprised of a spring hinge 80 which is connects to the support frame 78. The spring hinge 80 contains a tension spring 82 which exerts a force against any swinging force of the safety seat 70 so as to reduce the amount of swinging.

Figure 6:
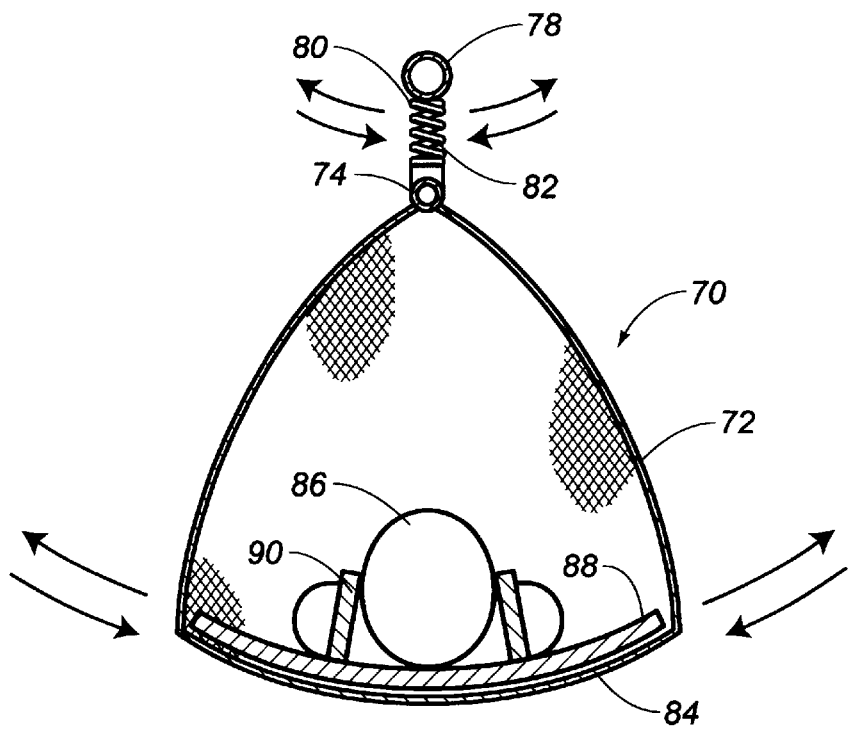
FIG. 6 is a cross-sectional view of the present invention as shown in FIG. 5.

FIG. 6 shows how the spring hinge 80 bends to exert a force against swinging. As the safety seat 70 swings and rotates about the support frame 78 axis, the tension spring 82 in the spring hinge 80 bends back and forth to return the safety seat 70 to the original stable position. As shown in FIG. 6, the rotation about the support frame 78 causes the shell 84 of the baby container 72 to stretch because of the weight of the baby 86 and the rotational forces. In the prior art, this distortion of the shell 84 would cause the baby 86 to rest on a distorted surface. However, in the present invention, the baby restraint pad 88 maintains a stable back support for the baby 86 to reduce discomfort associated with the distorted shell 84. The removable restraint pad 88 remains flexible and still functions to secure the baby 86 in place with stabilizer blocks 90.

Figure 7:
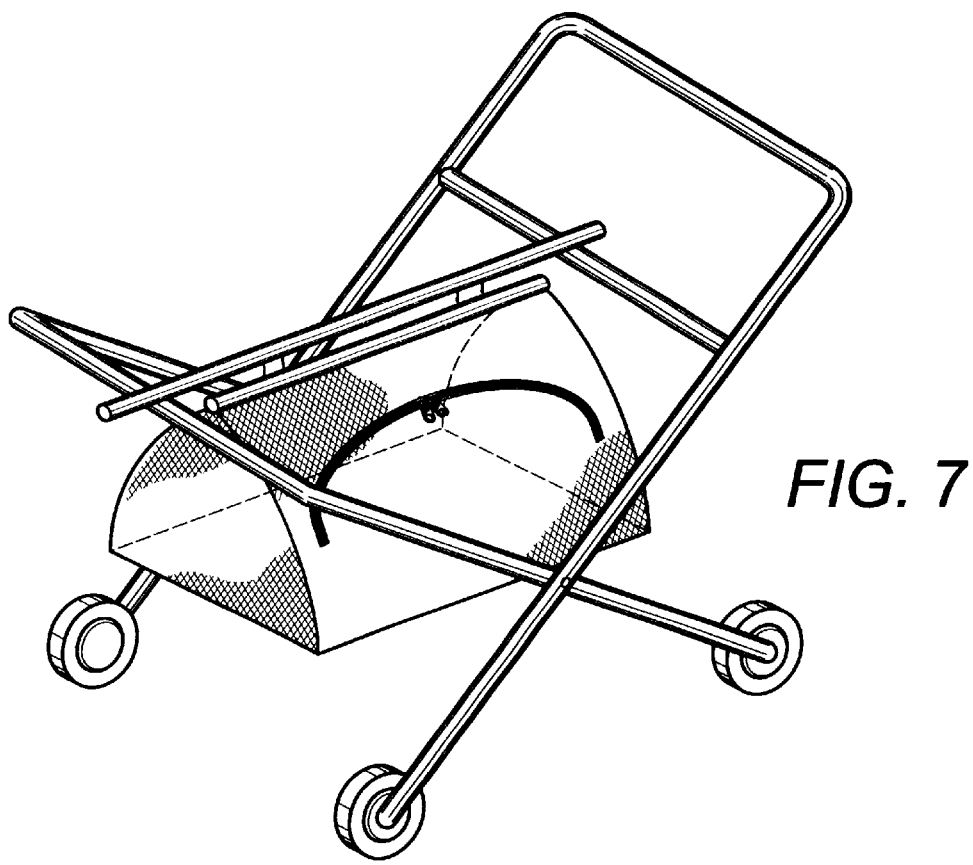
FIG. 7 is a perspective view of the present invention having the support frame secured to a stroller.

FIG. 7 is a perspective view of the safety seat attached to a support frame of a stroller.

Figure 8:
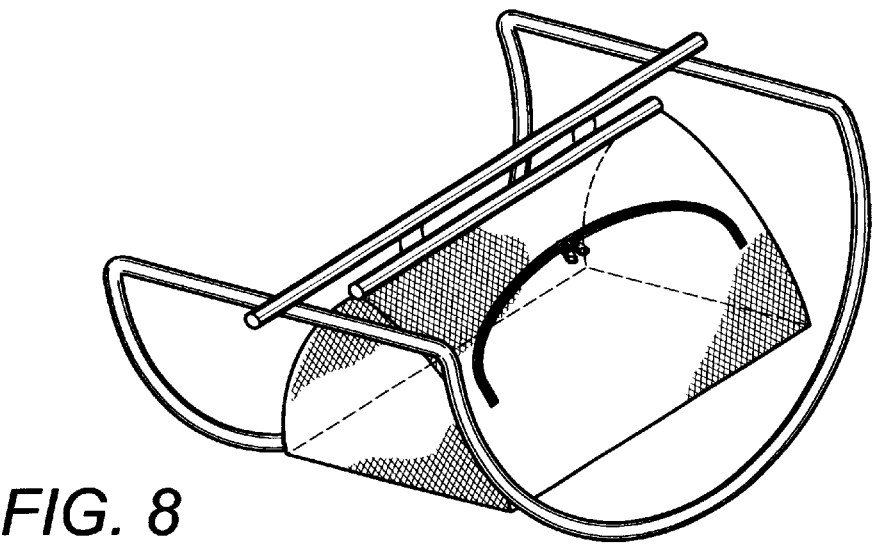
FIG. 8 is a perspective view of the present invention having the support frame secured to a rocker.

FIG. 8 is a perspective view of the safety seat attached to a support frame of a rocker.

Figure 9:
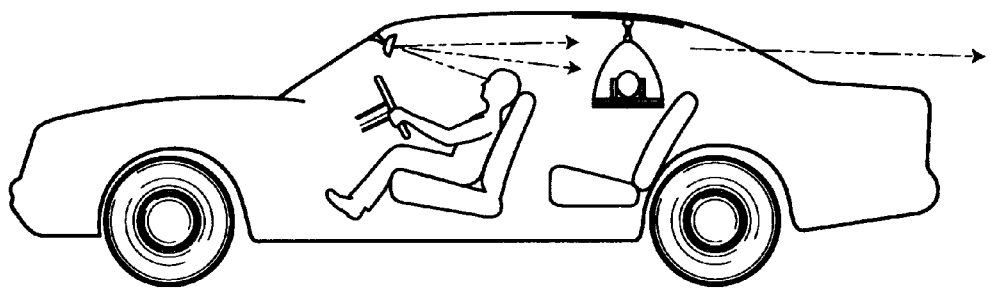
FIG. 9 is a sectional view of the present invention having the support frame secured to a motor vehicle and having a spring hinge attachment to the support frame.

FIG. 9 is a cross-sectional view of the safety seat attached to a support frame of a motor vehicle. FIG. 9 shows the embodiment described in FIG. 5 with the means for attaching comprised of a spring hinge.

Figure 10:
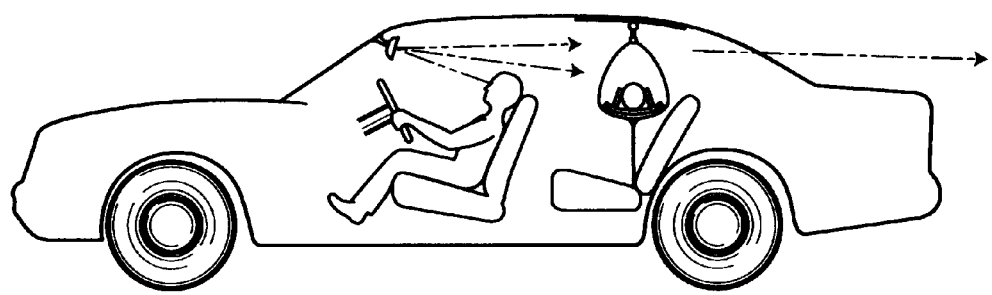
FIG. 10 is a section view of the present invention having the support frame secured to a motor vehicle and having a bottom fastening means to attach to a seat belt anchor.
Figure 11:
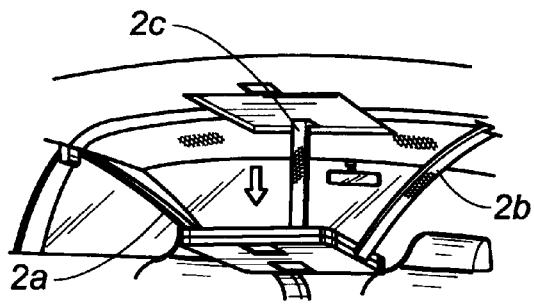
FIG. 11 is a perspective view showing a conventional child seat.
Figure 12:
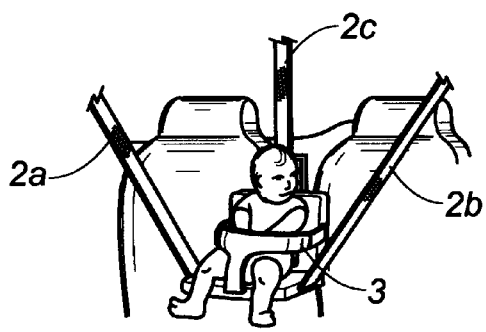
FIG. 12 is another perspective view showing the conventional child seat.
Figure 13:
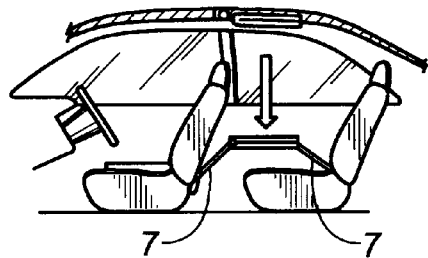
FIG. 13 is a side view showing the conventional child seat.

FIG. 10 is a cross-sectional view of the safety seat attached to a support frame of a motor vehicle. FIG. 10 shows the embodiment described in FIG. 3 with the bottom fastening means on the shell of the baby container. The elastic band is attached to a seat belt anchor.

The present invention offers a number of advantages not offered in the prior art. First, and foremost, the present invention reduces the amount of swinging of the safety seat during a collision or a sudden starting or stopping. One embodiment reduces swings using an elastic band attached to an anchor positioned below the safety seat. Another embodiment reduces swings by mounting a tension spring at the axis of rotation. The reduction is swing is important to maintain the baby is a stable and secure position.

Second, the present invention reduces the amount of discomfort of the baby. Previous safety seats have been of unitary construction so that distortion of the back surface of the seat would cause the baby to rest upon an uneven surface. The present invention provides a baby restraint pad with independent flexibility so as to reduce or minimize the amount of distortion experienced by the back support of the baby during swinging. The restraint pad is still flexible so as to bend and to wrap the stabilizer blocks around the baby; however, the pad is not as flexible as the baby container so that it can maintain back support while the baby container is distorted.

The foregoing disclosure and description of the invention is illustrative and explanatory thereof. Various changes in the details of the illustrated apparatus may be made within the scope of the appended claims without departing from the true spirit of the invention. The present invention should only be limited by the following claims and their legal equivalents.

I claim:

1. A safety seat for a baby comprising:

a baby container comprised of a shell and a frame, said shell being of an elastic material, said frame being covered by said elastic material, wherein said frame forms said shell into a curved generally triangular shape with an interior volume suitable for holding a baby, said shell having a rectangular base;

a mounting rod connected to said baby container along a top edge of said shell so as to form a single axis of rotation for swinging said baby container, said mounting rod having a means for attaching to a support frame, wherein said means for attaching further comprises a plurality of spring hinges, said spring hinges each containing a coiled spring suitable for reducing a swinging of the baby container by exerting a force against said baby container; and a baby restraint pad having a rectangular base corresponding to said base of said baby container and being positioned in said interior volume of said baby container; wherein said baby restraint pad further comprises a plurality of stabilizer blocks spaced from each other on a top surface thereof so as to securely hold a baby therebetween.

* * * * *